United States Patent
Hanna

(10) Patent No.: US 10,183,553 B2
(45) Date of Patent: Jan. 22, 2019

(54) HEATING SYSTEM FOR A MOTOR VEHICLE

(71) Applicant: Surface Igniter LLC, Chagrin Falls, OH (US)

(72) Inventor: George C Hanna, Chagrin Falls, OH (US)

(73) Assignee: Surface Igniter LLC, Chagrin Falls, OH (US)

( * ) Notice: Subject to any disclaimer, the term of this patent is extended or adjusted under 35 U.S.C. 154(b) by 648 days.

(21) Appl. No.: 14/458,329

(22) Filed: Aug. 13, 2014

(65) Prior Publication Data

US 2016/0046172 A1 Feb. 18, 2016

(51) Int. Cl.
| | | |
|---|---|---|
| *B60H 1/00* | (2006.01) | |
| *H05B 3/14* | (2006.01) | |
| *B60H 1/22* | (2006.01) | |
| *F24H 3/04* | (2006.01) | |

(52) U.S. Cl.
CPC ......... *B60H 1/2225* (2013.01); *F24H 3/0429* (2013.01); *B60H 2001/2237* (2013.01); *B60H 2001/2265* (2013.01); *B60H 2001/2287* (2013.01); *H05B 2203/023* (2013.01)

(58) Field of Classification Search
CPC .................. H05B 3/141; H05B 2203/027
USPC ................................ 219/208, 202, 270, 544
See application file for complete search history.

(56) References Cited

U.S. PATENT DOCUMENTS

| | | | | |
|---|---|---|---|---|
| 3,763,927 A | * | 10/1973 | Stafford | B60H 1/00864 165/202 |
| 4,232,211 A | | 11/1980 | Hill | |
| 4,459,466 A | * | 7/1984 | Nakagawa | G05D 23/2401 165/103 |
| 4,773,588 A | * | 9/1988 | Okada | B60H 1/2206 237/12.3 C |
| 4,858,825 A | * | 8/1989 | Kawamura | F23N 5/242 219/490 |
| 4,912,305 A | * | 3/1990 | Tatemasu | H05B 3/141 123/145 A |
| 4,927,077 A | * | 5/1990 | Okada | B60H 1/2206 237/12.3 C |
| 5,187,349 A | | 2/1993 | Curhan et al. | |
| 5,206,476 A | | 4/1993 | Fresch et al. | |
| 5,279,459 A | | 1/1994 | Single, II | |
| 5,427,313 A | * | 6/1995 | Davis, Jr. | B60H 1/00814 165/42 |
| 5,626,021 A | * | 5/1997 | Karunasiri | A47C 7/74 236/49.3 |
| 5,786,565 A | * | 7/1998 | Willkens | F23Q 7/22 219/260 |

(Continued)

*Primary Examiner* — Dana Ross
*Assistant Examiner* — Lawrence Samuels
(74) *Attorney, Agent, or Firm* — Hauptman Ham, LLP

(57) ABSTRACT

A heating system for a motor vehicle having an electrical supply circuit and an engine liquid cooling assembly includes a housing structure having an inlet duct, an air outlet duct and means such as a fan for creating a flow of air into the inlet and out of the outlet. The electric heater is capable of being heated to 1,800° F. in three (3) seconds or less disposed in said air flow to heat the air passing therethrough. The system further includes means for heating the flow of air by exposure to heated coolant and means for deactivating said electric heater when the air flow is being heated by the heated coolant.

1 Claim, 3 Drawing Sheets

(56) References Cited

U.S. PATENT DOCUMENTS

| | | | | |
|---|---|---|---|---|
| 6,002,105 A * | 12/1999 | Tamada | ............. | B60H 1/00064 219/202 |
| 6,076,593 A * | 6/2000 | Takagi | ............... | B60H 1/00914 165/201 |
| 6,079,485 A * | 6/2000 | Esaki | ................ | B60H 1/00285 165/42 |
| 7,361,868 B2 * | 4/2008 | Otto | .................... | B60H 1/2225 219/202 |
| 7,962,441 B2 * | 6/2011 | Kojima | ............. | B60H 1/00735 706/62 |
| 9,586,459 B2 * | 3/2017 | Markowitz | ........ | B60H 1/00735 |
| 2002/0175156 A1 * | 11/2002 | Hotta | .................... | F02P 19/028 219/270 |
| 2004/0084431 A1 * | 5/2004 | Uhl | ..................... | B60H 1/2225 219/201 |
| 2004/0251244 A1 * | 12/2004 | Torigoe | ................ | F28D 1/0246 219/208 |
| 2007/0295708 A1 * | 12/2007 | Yu | ............................ | F23Q 7/22 219/260 |
| 2008/0073057 A1 * | 3/2008 | Kojima | ............. | B60H 1/00735 165/43 |
| 2009/0206069 A1 * | 8/2009 | Hamel | ...................... | F23Q 7/22 219/270 |
| 2010/0200195 A1 * | 8/2010 | Himmelsbach | .... | B60H 1/00328 165/51 |
| 2011/0166711 A1 * | 7/2011 | Markowitz | ........ | B60H 1/00735 700/278 |
| 2011/0240623 A1 * | 10/2011 | McGaugh | ................ | B60L 1/02 219/202 |
| 2011/0290785 A1 * | 12/2011 | Schaeffer | ............ | B60N 2/5685 219/538 |
| 2012/0145695 A1 * | 6/2012 | Radmacher | ............ | B28B 1/008 219/270 |
| 2014/0083672 A1 * | 3/2014 | Rollinson | .......... | B60H 1/00764 165/202 |

* cited by examiner

HEATING SYSTEM FOR A MOTOR VEHICLE

FIELD OF THE INVENTION

This invention relates to a heating system for a motor vehicle and more particularly to an electrical heater for rapidly heating the interior of a motor vehicle.

BACKGROUND FOR THE INVENTION

Electric heaters for heating the interior of a motor vehicle are well known and have been in use for many years. For example, a U.S. Pat. No. 4,232,211 of Hill discloses an automobile auxiliary heater to supply heat to the passenger's compartment of an automobile car body. As disclosed, a fan initially draws cold air into a fan chamber of the main inlet cross duct and forces it through an electric heating coil and then through one of two converging branch outlet ducts to a common outlet and at the same time directs the heated air into the passenger compartment. When the compartment has been heated preliminarily, the operator de-energizes the electric heating coil and reverses the fan causing it to direct outside air through the conventional engine radiator-connected liquid heater and then through the opposite converging branch outlet duct. Thus supplying air heated by the conventional heater to the passenger compartment. Electricity for the electric heating coil is provided by the car alternator and/or storage battery.

A more recent U.S. Pat. No. 5,187,349 of Curhan et al. discloses a deep frost and passenger compartment heater system. As disclosed, a system for heating the passenger compartment of an automotive vehicle has a hot water heater receiving heat from a vehicle engine arranged in series with a self-regulating electrical resistance heater of positive temperature coefficient of resistivity that has a power source for energizing the electrical resistance heater. A fan directs air in heat transfer relation to the hot water heater and to the electrical resistance heater in sequence to provide a heated air output to the passenger compartment. Fan speed is controlled to regulate the volume of air directed in heat transfer relation to the heaters so that the electrical resistance heater is promptly and consistently capable of heating the volume of air to at least a selected minimum temperature of 100° F. This provides a passenger compartment with comfort beginning very promptly after engine startup even on a cold day.

Additionally, a U.S. Pat. No. 6,002,105 of Tamada discloses an air conditioning control apparatus for vehicles. As disclosed, a first positive temperature coefficient (PTC) heater and a second PTC heater are provided at the downstream side of a heater core that uses engine cooling water for its heat source, and the second PTC heater is positioned at a foot outlet. Under conditions that require the use of the PTC heaters, power is supplied to all the PTC heaters if the discharge mode is set to a FOOT mode or a DEF/FOOT mode, whereas power is supplied only to the first PTC heater if the discharge mode is set to a DEFROST mode. In an air conditioning control apparatus for vehicles with a heater core and PTC heaters warm air at appropriate temperatures can be supplied through both the foot outlet and the defrost outlet during an initial stage of heating in which the temperature of the engine cooling water is low. In addition, since no power is supplied to the second PTC heater unless the foot outlet is open, energy resources are saved.

Notwithstanding the above, it is presently believed that there is a need and a potential commercial market for an improved heating system in accordance with the present invention. There should be a commercial market for such heaters because they provide a rapid response upon entering the motor vehicle to heat the passenger compartment in cold weather.

Further, it is presently believed that the improved heaters in accordance with the present invention will provide not only rapid response time and can be added to present day heaters with minimum costs and will be reliable over a long period of time. Such heaters are uniquely provided by a plurality of miniature gas igniters.

SUMMARY OF THE INVENTION

In essence, the present invention contemplates a heating system for a motor vehicle having an electrical supply circuit and an engine cooling assembly. The system comprises and/or consists of the following elements.

A housing that includes an air inlet, an air outlet and means as for example a fan for creating a flow of air into the inlet and out of the outlet. In addition, an electric heater that is capable of being heated to 1,800° F. (red heat) in three (3) seconds or less is disposed in the air flow to heat the air passing through the housing. The system also includes means for heating the flow of air by exposure to heated coolant and means for deactivating the electric heater when the air flow is being heated by the heated coolant.

In a preferred embodiment of the invention, the electric heater is selected from one or more miniature silicon nitride gas igniters selected from the group consisting of silicon nitride, molybdenum disilicide and mixtures thereof that draw 2.5 to 3.5 amperes from a standard 12 volt electrical system. Such igniters reach 1,800° F. in less than three (3).

The invention will now be described in connection with the accompanying drawings.

DESCRIPTION OF THE PREFERRED EMBODIMENTS OF THE INVENTION

Figures 1, 2:
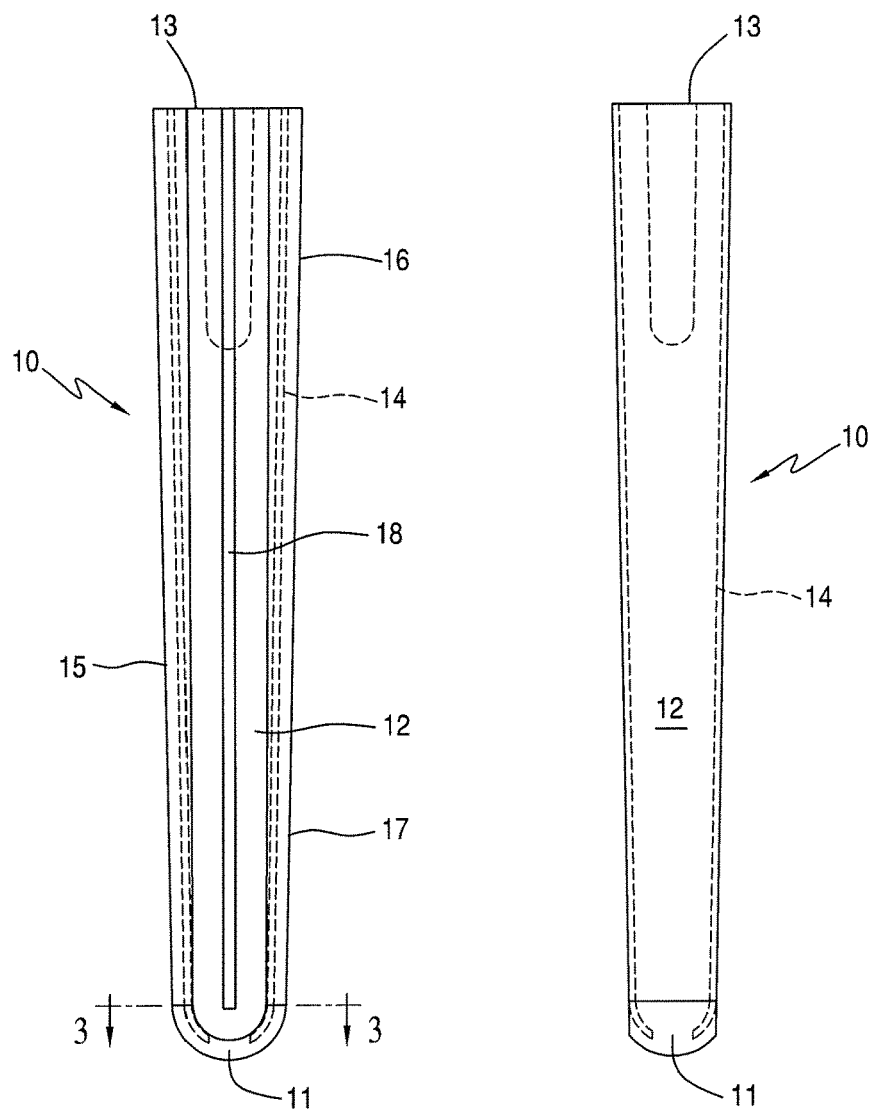
FIG. 1 is a plan view of a ceramic heater/igniter according to a first embodiment of the invention.
FIG. 2 is a plan view of the heater/igniter shown in FIG. 1 but rotated by 90 degrees.
Figure 3:
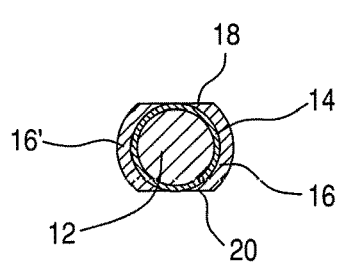
FIG. 3 is a sectional view taken along the lines 3-3 in FIG. 1 of the heater/igniter shown in FIGS. 1 and 2.
Figure 4:
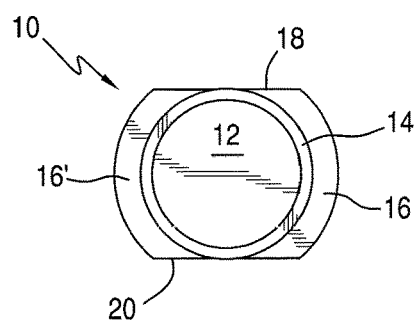
FIG. 4 is an enlarged view of FIG. 3.
Figure 5:
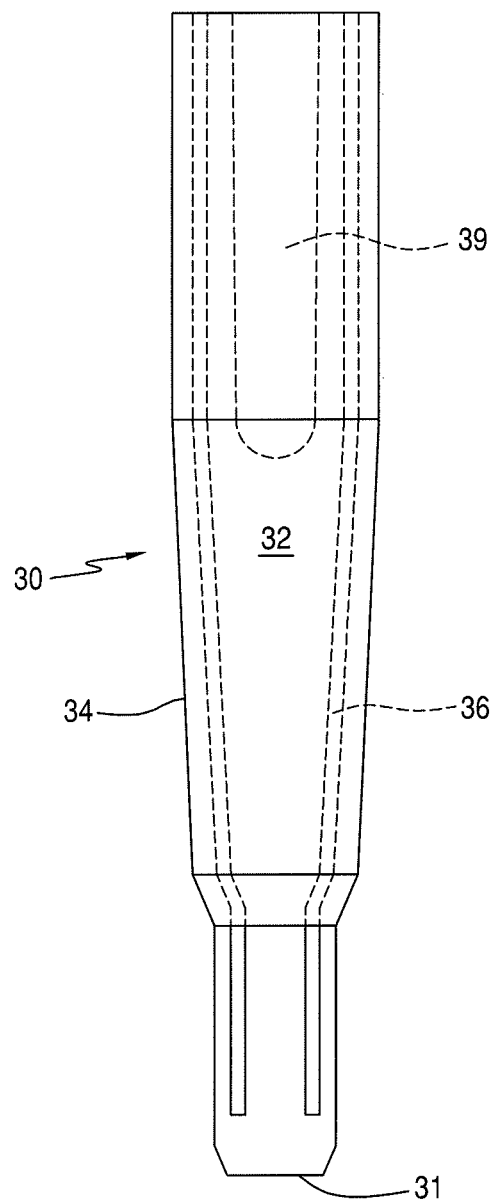
FIG. 5 is a plan view of a heater/igniter according to a second embodiment of the invention.

An example of a miniature gas igniter of a type considered to be useful in the present invention is described in a pending U.S. patent application Ser. No. 12/963,796 in the name of Stephen Radmacher which is incorporated herein in its entirety. As disclosed therein, rod shaped ceramic igniters typically comprise a cylindrical shaped body that includes a tapered or narrow section that concentrates heat in specific areas. The present invention relates to modifying the surface layer and inner annular portion by removing material by slicing or grinding. For example, the resulting surface is planar. This modification is preferably done in the green stage after the ceramic is formed by slip-casting, injection molding, extrusion or the like. In this stage, the ceramic material can be easily removed or if not subsequently removed by a high speed grinder. The igniter body is subsequently heated in a sintering furnace, assembled in a holder with electrical leads attached in a conventional manner.

It has now been found that certain geometric modifications to an annular layered ceramic igniter/heater produce unique electrical properties as well as faster response time and may eliminate the need for a conductive core. In the present invention, a facet is cut along the length of the rod and separates an outer ceramic layer into conductive adjacent halves that are joined to create a U-shape at the heater tip. To be more specific, the facet is formed by partially cutting into or through the insulating layer to provide separation of the surface layer to thereby form a pair of "legs". The face of the rod provides termination for attaching positive and negative electrical leads. It is also contemplated that a complex heater pattern could be made by additional faceting in the tip region to create a coil pattern to increase the length of the circuit.

Referring now to the figures, a ceramic heater/igniter 10 can be manufactured using a number of conventional steps and one non-conventional modification. For example, four ceramic compositions are prepared using conventional techniques. The various compositions are preferably selected from about 80% by volume silicone nitride and about 20% by volume molybdenum disilicide and wherein the silicone nitride particles are larger than the particle size of the molybdenum disilicide. In a preferred embodiment of the invention there are three resistant layers, one in the core and a second and third composition in the two annular segments or legs. In this embodiment all three components are about 80% by volume silicone nitride and 20% by volume molybdenum disilicide. The components of the core and in the annular segments may each contain essentially identical amounts of silicone nitride and molybdenum disilicide, but the resistivity of the core should be less than the resistivity in the annular segments and in the tip For example, particle size in the core is larger than in the annular segments to reduce the resistivity in the core while using small particles in the annular segments to increase the resistivity of those segments.

Figure 6:
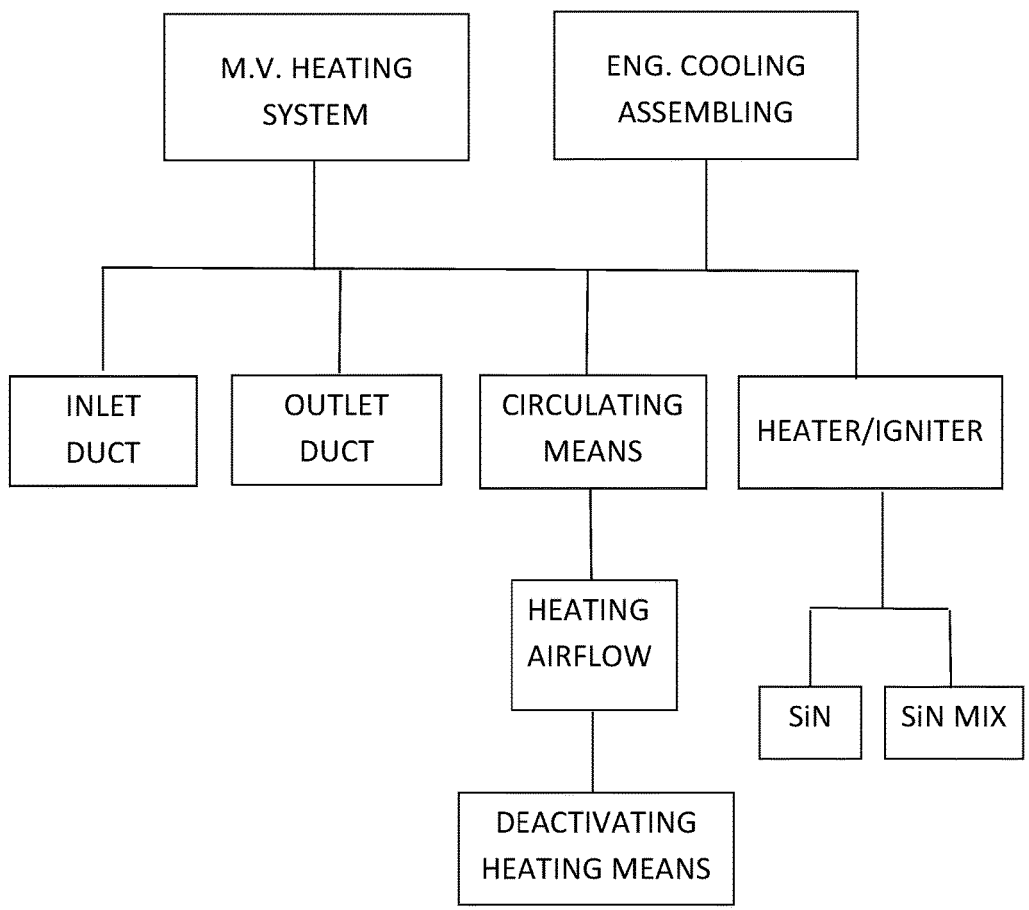
FIG. 6 is a block diagram of a first embodiment of the invention; schematic illustration showing three flow channels and a drilled hole or passageway.

FIG. 6 illustrates a first embodiment of the invention wherein a heating system for a motor vehicle's passenger compartment and an engine cooling assembly are provided. The system and assembly provide hot air that enters through the inlet duct and exits from the outlet duct in response to a circulating means. A circulating means circulates the heated air by an electric heater/igniter which may be made from silicon nitride or a silicon nitride and molybdenum disilicide mix. The heat of airflow includes means for deactivating the heating step at a temperature of approximately 100° in order to avoid injury of a passenger due to excessive heat. Subsequently, the heated airflow may be reactivated to maintain a comfortable passenger compartment.

The multi-layer ceramic heater/igniter 10 also includes an insulative layer 14 between the core 12 that can be a third phase and the layer 16, 15. The insulative layer 14 may also be made of silicone nitride and molybdenum disilicide, but should contain at least 75 volume percent of non-conductive material such as silicone nitride and up to 25% by volume molybdenum disilicide.

The multi-layer ceramic heater/igniter 10 is made by slip casting to form a green body then removing material from opposite sides of the green body to form two almost parallel, but slightly converging, facets that preferably extend over at least a majority of the heater/igniter between the back surface 13 to near the tip 11. In one embodiment of the invention the two facets 18 and 20 extend over essentially the entire length of the heater/igniter 10 as can be done for a two or three phase option.

After removing the material between the annular segments 15 and 16 (FIG. 1) the heater/igniter 10 is then slowly air dried and then heated in a vacuum at atmospheric pressure to approximately 900° C. in order to burn off the organic binder. The ceramic is then held in an inert atmosphere and heated to a temperature above 1600° C. and isotatic pressure of greater than 10 megapascales for sintering the layer into a unitary monolithic structure.

The finished product is essentially pore free to prevent accelerated erosion at high temperature and to be of sufficient strength to withstand thermal cycling and vibration. The annular segments are then attached to a positive and negative source of energy in a conventional manner.

In a preferred embodiment of the invention a plurality of silicon nitride hot surface igniters manufactured and sold by Surface Igniter LLC, P.O. Box 23009, Chagrin Falls, Ohio 44023 USA and identified by Model No. SN(001-014) are used. Two or three such igniters are preferred.

While the invention has been disclosed in connection with its preferred embodiments it should be recognized that changes and modifications may be made therein without departing from the scope of the claims.

What is claimed is:

1. A heating system for a motor vehicle having an electrical supply circuit and an engine liquid cooling assembly, said system consisting of:
   a housing structure including an air inlet duct, an air outlet duct and means including a fan for creating a flow of air into said inlet duct and out of said outlet duct;
   two or more miniature silicon nitride/molybdenum disilicide gas igniters each of which is heated to 1800° F. in three seconds or less disposed in said flow of air to heat the air passing therethrough,
   wherein the heating system is made of silicon nitride and molybdenum disilicide containing 75 volume percent of silicon nitride and 25% by volume molybdenum disilicide and wherein the particle size of the silicon nitride is larger than the particle size of the molybdenum disilicide;
   a mass of liquid coolant;
   a sensor for detecting the temperature of said liquid coolant,
   wherein said flow of air is heated by exposure to heated coolant, and
   wherein said miniature silicon nitride igniters are deactivated when said airflow is heated by heated coolant at a temperature of at least 100° F.

* * * * *